United States Patent
Bryan (10) Patent No.: US 11,542,864 B2
(45) Date of Patent: Jan. 3, 2023

(54) ADAPTIVE VERTICAL LIFT ENGINE (AVLE) FAN

(71) Applicant: Rolls-Royce North American Technologies Inc., Indianapolis, IN (US)

(72) Inventor: William Barry Bryan, Indianapolis, IN (US)

(73) Assignee: ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 482 days.

(21) Appl. No.: 16/397,854

(22) Filed: Apr. 29, 2019

(65) Prior Publication Data

US 2020/0340400 A1    Oct. 29, 2020

(51) Int. Cl.
| | | |
|---|---|---|
| *F02C 7/04* | (2006.01) | |
| *F01D 11/02* | (2006.01) | |
| *F01D 17/16* | (2006.01) | |
| *F02K 3/06* | (2006.01) | |

(52) U.S. Cl.
CPC .......... *F02C 7/04* (2013.01); *F01D 11/02* (2013.01); *F01D 17/162* (2013.01); *F02K 3/06* (2013.01); *F05D 2240/122* (2013.01); *F05D 2240/14* (2013.01); *F05D 2240/301* (2013.01); *F05D 2240/304* (2013.01); *F05D 2240/55* (2013.01); *F05D 2260/606* (2013.01)

(58) Field of Classification Search
CPC .......... F01D 11/02; F01D 17/162; F02C 7/04; F02K 3/06; F02K 3/075; F05D 2240/122; F05D 2240/14; F05D 2240/301; F05D 2240/304; F05D 2240/55; F05D 2260/606
See application file for complete search history.

(56) References Cited

U.S. PATENT DOCUMENTS

| | | | |
|---|---|---|---|
| 3,449,914 A | | 6/1969 | Brown |
| 4,791,783 A | | 12/1988 | Neitzel |
| 4,969,326 A | * | 11/1990 | Blessing ............... F04D 29/083 60/226.1 |
| 5,261,227 A | | 11/1993 | Giffin, III |
| (Continued) | | | |

FOREIGN PATENT DOCUMENTS

| | | |
|---|---|---|
| DE | 69414963 T2 | 7/1999 |
| EP | 0646720 A1 | 9/1994 |
| (Continued) | | |

OTHER PUBLICATIONS

European Search Report, dated Sep. 14, 2020, pp. 1-7, European Patent Application No. 20165664.2-1007, European Patent Office, The Hague, The Netherlands.
(Continued)

*Primary Examiner* — Jason H Duger
(74) *Attorney, Agent, or Firm* — Crowell & Moring LLP (57) ABSTRACT

A turbofan engine has a fan portion in fluid communication with a core stream and a bypass stream of air separated by splitters disposed both upstream and downstream of the fan portion. A blade splitter (shroud) on the fan partially spans the fan blade thus separating the core and bypass streams downstream while leaving a gap upstream for communication between the flows. The communication gap expands the operational range of the fan over fans without the communication gap.

14 Claims, 7 Drawing Sheets

(56) References Cited

U.S. PATENT DOCUMENTS

| | | | |
|---|---|---|---|
| 5,402,638 | A | 4/1995 | Johnson |
| 5,404,713 | A | 4/1995 | Johnson |
| 5,809,772 | A | 9/1998 | Griffin et al. |
| 9,915,149 | B2 | 3/2018 | Rice |
| 10,125,622 | B2 | 11/2018 | Rice et al. |
| 2005/0072158 | A1 | 4/2005 | Christopherson |
| 2010/0180572 | A1 | 7/2010 | Wadia et al. |
| 2011/0167784 | A1 | 7/2011 | Johnson et al. |
| 2011/0167791 | A1 | 7/2011 | Johnson et al. |
| 2011/0167792 | A1 | 7/2011 | Johnson et al. |
| 2011/0171007 | A1 | 7/2011 | Johnson et al. |
| 2017/0058676 | A1 | 3/2017 | Rice |
| 2017/0058677 | A1 | 3/2017 | Rice |
| 2017/0058690 | A1 | 3/2017 | Rice et al. |
| 2017/0058766 | A1 | 3/2017 | Rice |
| 2017/0058831 | A1* | 3/2017 | Bryan .................. F02K 3/06 |
| 2017/0058832 | A1 | 3/2017 | Rice |
| 2017/0058833 | A1 | 3/2017 | Rice |
| 2017/0191427 | A1 | 7/2017 | McNeil et al. |

FOREIGN PATENT DOCUMENTS

| | | |
|---|---|---|
| EP | 0646720 B1 | 2/1998 |
| JP | 2008-163945 A | 7/2008 |
| JP | 5121440 B2 | 1/2013 |
| JP | 2013-506081 A | 2/2013 |
| WO | 2011/038213 A1 | 3/2011 |
| WO | 2011/038216 A1 | 3/2011 |

OTHER PUBLICATIONS

European Office Action, dated Nov. 18, 2022, pp. 1-5, issued in European Patent Application No. 20165664.2, European Patent Office, Rijswijk, The Netherlands.

\* cited by examiner

ADAPTIVE VERTICAL LIFT ENGINE (AVLE) FAN

GOVERNMENT RIGHTS

This present application was made with United States government support under Contract No. W911W6-16-2-0011, awarded by the United States Army. The United States government has certain rights in the present application.

BACKGROUND

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, fan, generator or other mechanical apparatus or to develop thrust directly by expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a fraction of the energy is made available for propulsive purposes or work.

Typically, turbofan engines include at least two air streams. All air utilized by the engine initially passes through a fan, and then it is split into the two air streams. The inner air stream is referred to as core air and passes into the compressor portion of the engine, where it is compressed. This air is fed to the combustor portion of the engine where it is mixed with fuel and the fuel is combusted. The combustion gases are then expanded through the turbine portion of the engine, which extracts energy from the hot combustion gases, the extracted energy being used to run the compressor, the fan and other accessory systems. The remaining hot gases then flow into the exhaust portion of the engine, which may be used to produce thrust for forward motion to the aircraft.

The outer air flow stream bypasses the engine core and is pressurized by the fan. Typically, no other work is done on the outer air flow stream which continues axially down the engine but outside the core. The bypass air flow stream also can be used to accomplish aircraft cooling by the introduction of heat exchangers in the fan stream. Downstream of the turbine, the outer air flow stream is used to cool engine hardware in the exhaust system. When additional thrust is required (demanded), some of the fans bypass air flow stream may be redirected to the augmenter (afterburner) where it is mixed with core flow and fuel to provide the additional thrust to move the aircraft.

Many current and most future aircrafts need efficient installed propulsion system performance capabilities at diverse flight conditions and over widely varying power settings for a variety of missions. Current turbofan engines are limited in their capabilities to supply this type of mission adaptive performance, in great part due to the fundamental operating characteristics of their core systems which have limited flexibility in load shifting between shaft and fan loading.

When defining a conventional engine cycle and configuration for a mixed mission application, compromises have to be made in the selection of fan pressure ratio, bypass ratio, and overall pressure ratio to allow a reasonably sized engine to operate effectively. In particular, the fan pressure ratio and related bypass ratio selection needed to obtain a reasonably sized engine capable of developing the thrusts needed for combat maneuvers are non-optimum for efficient low speed flight where a significant portion of the engine output is transmitted to the shaft. Engine performance may suffer due to the bypass/core pressure leakage that may occur at reduced fan power/load settings.

Figure 1A:
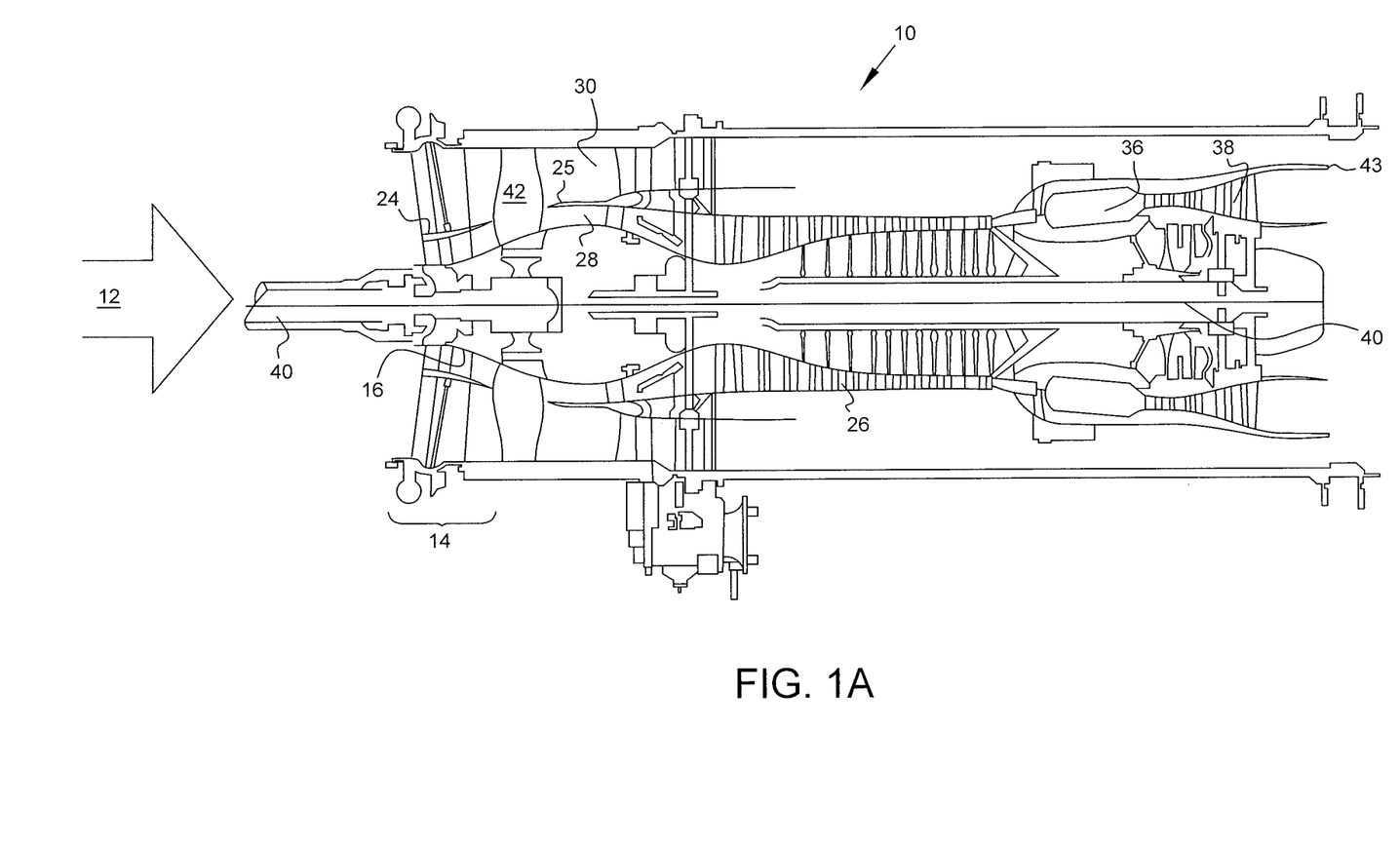
FIGS. 1a and 1b are illustrations representing conventional turbofan engines.

Referring to the drawings wherein identical reference numerals denote the same elements throughout the various views, FIG. 1a shows a general orientation of a turbofan engine in a cut away view. In the turbofan engine shown, the flow of the air is generally axial. The engine direction along the axis is generally defined using the terms "upstream" and "downstream" generally which refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle. Additionally, outward/outboard and inward/inboard refer to the radial direction. For example, the bypass duct is outboard the core duct. The ducts are generally circular and co-axial with each other.

Figure 2:
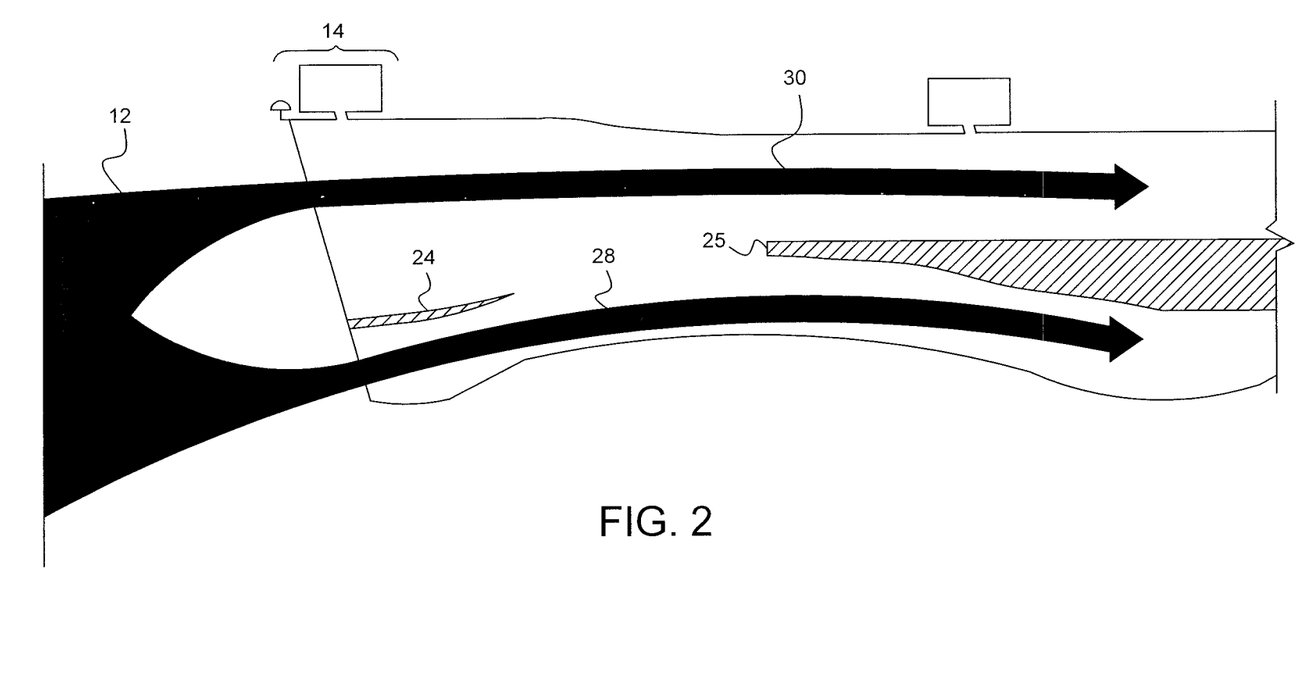
FIG. 2 is an illustration of the Bypass and primary stream flow paths.

As ambient inlet airflow 12 enters inlet fan duct 14 of turbofan engine 10, through the guide vanes 15, passes by fan spinner 16 and through fan rotor (fan blade) 42. The airflow 12 is split into primary (core) flow stream 28 and bypass flow stream 30 by upstream splitter 24 and downstream splitter 25. In FIG. 2, the bypass flow stream 30 along with the core/primary flow stream 28 is shown, the bypass stream 30 being outboard of the core stream 28. The inward portion of the bypass steam 30 and the outward portion of the core streams are partially defined by the splitters upstream of the compressor 26. The fan 42 has a plurality of fan blades.

Figure 1B:
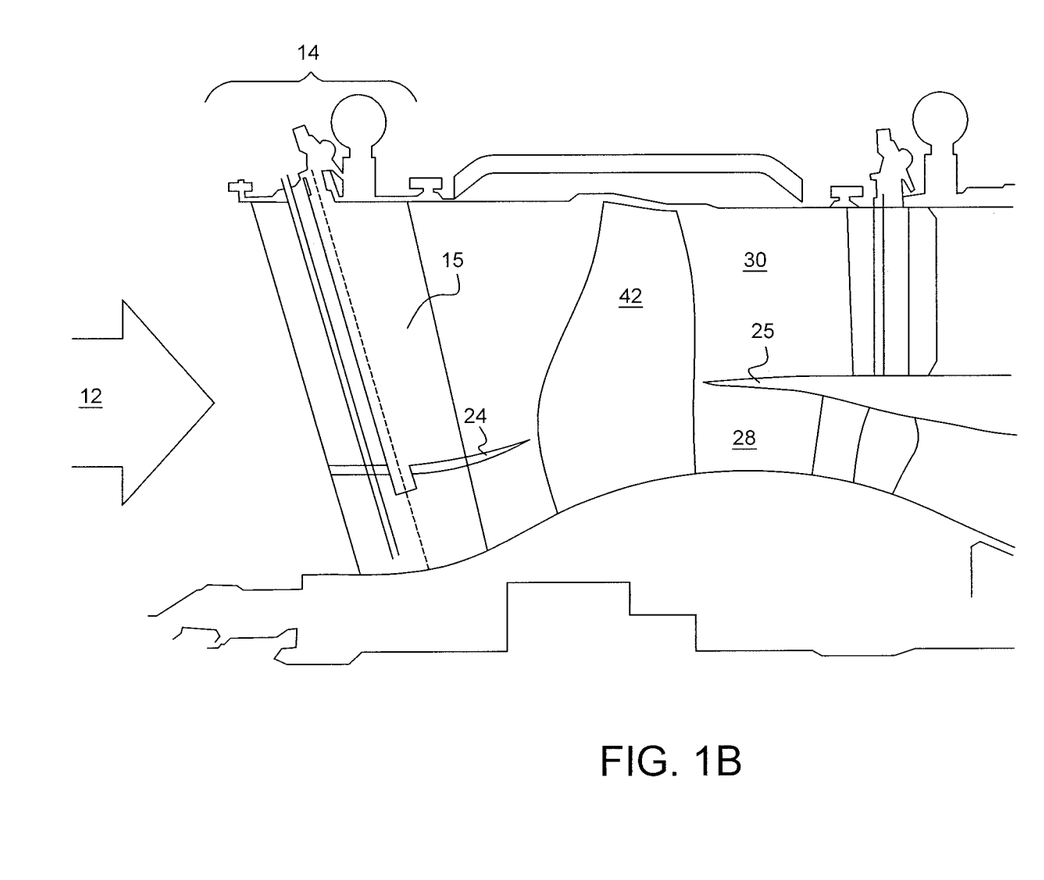

As shown in FIGS. 1a and 1b the fan blade 42 shown is rotating about the engine axis into the page, therefor the low pressure side of the blade 42 is shown, the high pressure side being on the opposite side. The Primary flow stream 28 flows through compressor 26 that compresses the air to a higher pressure. The compressed air typically passes through an outlet guide vane to straighten the airflow and eliminate swirling motion or turbulence, a diffuser where air velocity decreases, and a compressor manifold to distribute the air in a smooth flow. The core flow stream 28 is then mixed with fuel in combustion chamber 36 and the mixture is ignited and burned. The resultant combustion products flow through turbines 38 that extract energy from the combustion gases to turn fan rotor 42, compressor 26 and any shaft work by way of turbine shaft 40. While FIGS. 1a and 1b only show one shaft for clarity, commonly turbine engines have multiple shafts or spools (e.g. high pressure spool, low pressure spool, etc.) The gases, passing exhaust cone, expand through an exhaust nozzle 43 to produce thrust. Primary flow stream 28 leaves the engine at a higher velocity than when it entered. Bypass flow stream 30 flows through fan rotor 42, flows by bypass duct outer wall 27, an annular duct concentric with the core engine flows through fan discharge outlet and is expanded through an exhaust nozzle to produce additional thrust. Turbofan engine 10 has a generally longitudinally extending centerline represented by engine axis 46.

Current conventionally bladed core engines cannot maintain constant or near constant operating pressure ratios as bypass flow is reduced. Current conventionally bladed fan rotors do not have the flexibility in efficiently reducing fan pressure ratio while maintaining core pressure.

With reduced or no flow in the Bypass stream 30, the core stream 28 relative pressure is greater than that in the Bypass stream 30. In the area of the fan shown as 50 in FIG. 1b, pressure differences between the core duct and the bypass duct can cause cross flow between the ducts in the area of the fan blade across the region 50 from the core stream 28 into the bypass stream 30 thus reducing the core pressure which has a deleterious effect on the operation of the core and un-necessarily loading the turbine to recover the lost pressure.

A partial blade splitter, similar to a partial span shroud or clapper, separating the core and bypass streams as described herein, can limit the pressure loss in the core and the subsequent degradation in output of the core engine while maintaining communication across the flows. The split flow path enables the fan to operate effectively in a turbofan mode and a turboshaft mode where the bypass flow, pressure and thrust are substantially reduced and power is available to the shaft.

These and many other advantages of the present subject matter will be readily apparent to one skilled in the art to which the invention pertains from a perusal of the claims, the appended drawings, and the following detailed description of preferred embodiments.

SUMMARY

According to some aspects of the disclosure, a turbofan engine may have a fan in fluid communication with a core stream and a bypass stream of air. The core stream may be compressed by the fan and a core compressor portion, heated and expanded through a core turbine portion. The core turbine portion may drive the fan and the compressor portion The core turbine portion may be connected to a shaft. The bypass stream may be compressed by the fan. The core and the bypass streams may be separated by a partial midspan shroud on the fan and a downstream splitter. The partial midspan shroud may extend axially forward from the trailing edge of the fan to at least the midchord of the fan. A seal between the trailing edge of the partial midspan shroud and the leading edge of the downstream splitter may restrict flow between the core stream and the bypass stream.

Some embodiments may include, an adjustable inlet guide vane upstream of the fan, the adjustable inlet guide vane positional between a first position and a second position, the second position restricting flow of the bypass stream more than the first position. It is envisioned, however not required, that the adjustable portion of the inlet guide vane only operates on the flow associated with the bypass stream and the portion of the guide vane in the flow associated with the core is fixed or independently adjustable. Some embodiments may include an upstream splitter on the adjustable guide vane, the upstream splitter having a trailing edge axially displaced from the leading edge of the fan. In some embodiments, the seal may be selected from the group consisting of labyrinth seal, lip seal and carbon seal.

In some embodiments, the midspan partial shroud extends axially forward from the trailing edge of the fan no more than ⅔ of a local chord on the fan. In some embodiments, the midspan partial shroud extends axially forward from the trailing edge of the fan no more than ⅞ to ½ of a local chord on the fan. The fan may have a blade span and the midspan partial shroud may be radially located on the middle third of the blade span. In some embodiments the midspan partial shroud may be concentric with the fan.

Some embodiments may include an additional splitter, a second fan, and a second seal, the second fan positioned upstream of the first fan, said second fan comprising a second midspan partial shroud extending axially at least to a local midchord of the second fan but short of the leading edge of the second fan, the second seal connecting the trailing edge of the second midspan partial shroud with the leading edge of the additional splitter. In some embodiments, the partial midspan shroud rotates about the engine axis with respect to the downstream splitter.

According to some aspects of the disclosure, a turbofan engine may include a fan, a core duct which may define a portion of a core fluid path, a bypass duct which may define a portion of a bypass fluid path. The bypass duct may be concentric with the core duct and radially displaced from the core duct. A downstream splitter may define an annular border portion between the core duct and the bypass duct, and downstream of the fan. An annular border region may extend between a leading edge of the fan and a leading edge of the downstream splitter. The annular border region may separate the core fluid path and the bypass fluid path. The fan may rotate through the annular border region. A shroud within the annular border region may extend between blades in the fan. The shroud may have a leading edge downstream from the leading edge of the blades and upstream of the midchord. The shroud may rotate with respect to the downstream splitter. A seal between a trailing edge of the shroud and the leading edge of the downstream splitter may restrict migration from the core fluid path to the bypass fluid path. A variable inlet guide vane upstream of the fan may restrict the bypass flow at a first position and may not restrict the bypass flow at a second position.

In some embodiments, a pressure in the core fluid path may be higher than a second pressure in the bypass fluid path when the variable inlet guide vane is at the first position. Some embodiments may include an upstream splitter defining an annular first border portion between the core duct and the bypass duct. In some embodiments, the seal is selected from the group consisting of labyrinth seal, lip seal and carbon seal. In some embodiments the shroud extends axially forward from the trailing edge of the fan no more than ⅔ of a local chord on the fan. In some embodiments, the shroud extends axially forward from the trailing edge of the fan no more than ⅞ to ½ of a local chord on the fan. In some embodiments, the fan has a blade span and the shroud may be radially located on the middle third of the blade span. In some embodiments, the shroud may be concentric with the fan.

DETAILED DESCRIPTION

Figure 3:
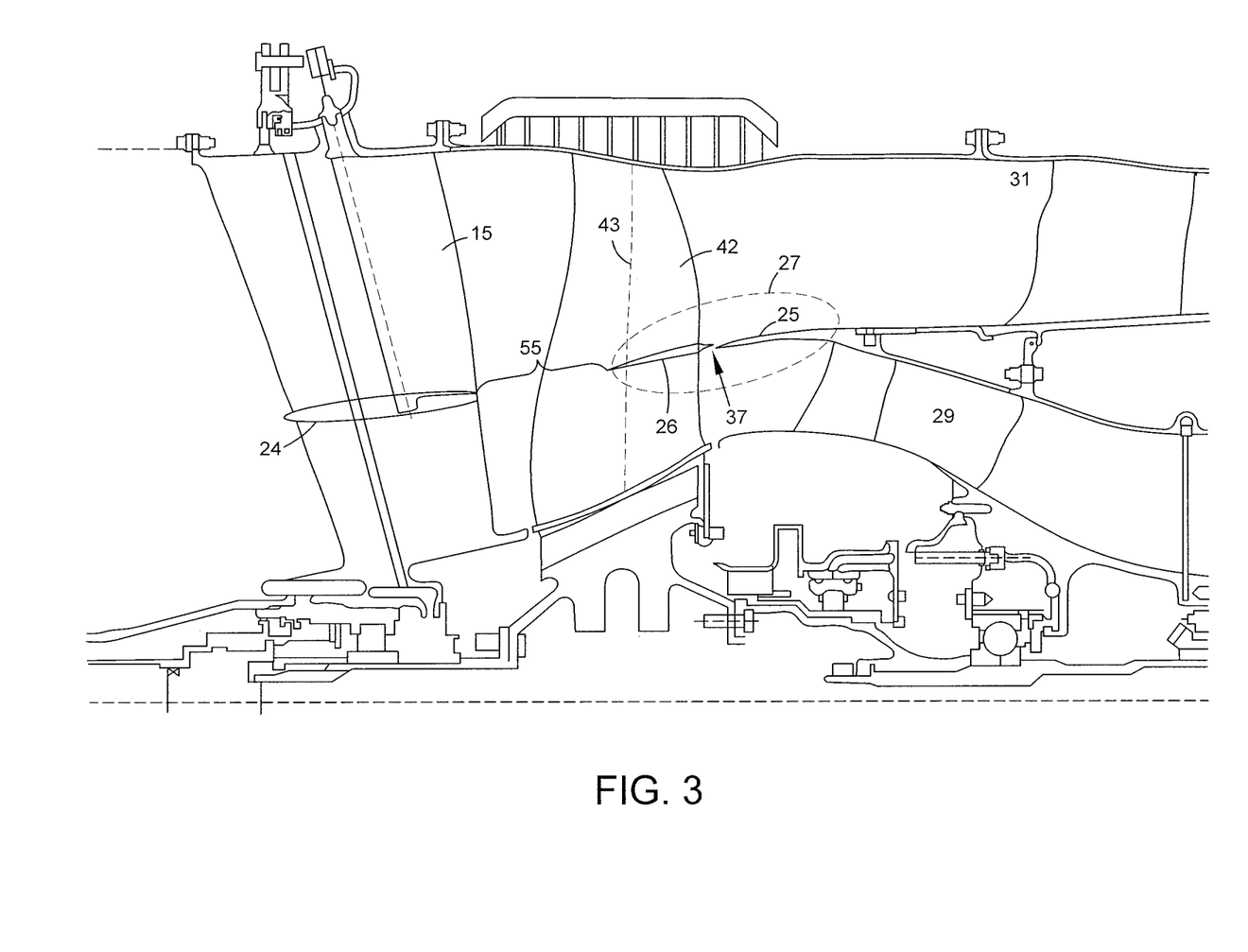
FIG. 3 is an illustration of a turbofan engine according to an embodiment of the disclosed subject matter.

FIG. 3 illustrates a Bypass flow duct 31 lying radially outward from the core flow duct 29. The fan 42 is positioned upstream from the splitter 25 that separates air flow between the ducts. The inlet guide vane splitter 24 is positioned upstream from the fan 42 at radially inward of the adjustable inlet guide vane 15. As the inlet guide vane 15 angle is changed, the bypass flow may be inhibited and pressure within the bypass flow duct 31 may differ from the pressure present in the core flow duct 29. In prior systems, air can cross between the two ducts in the vicinity of the fan blade in region 50 as shown in FIG. 1b thus causing detrimental engine performance in the core as described previously.

Figure 4:
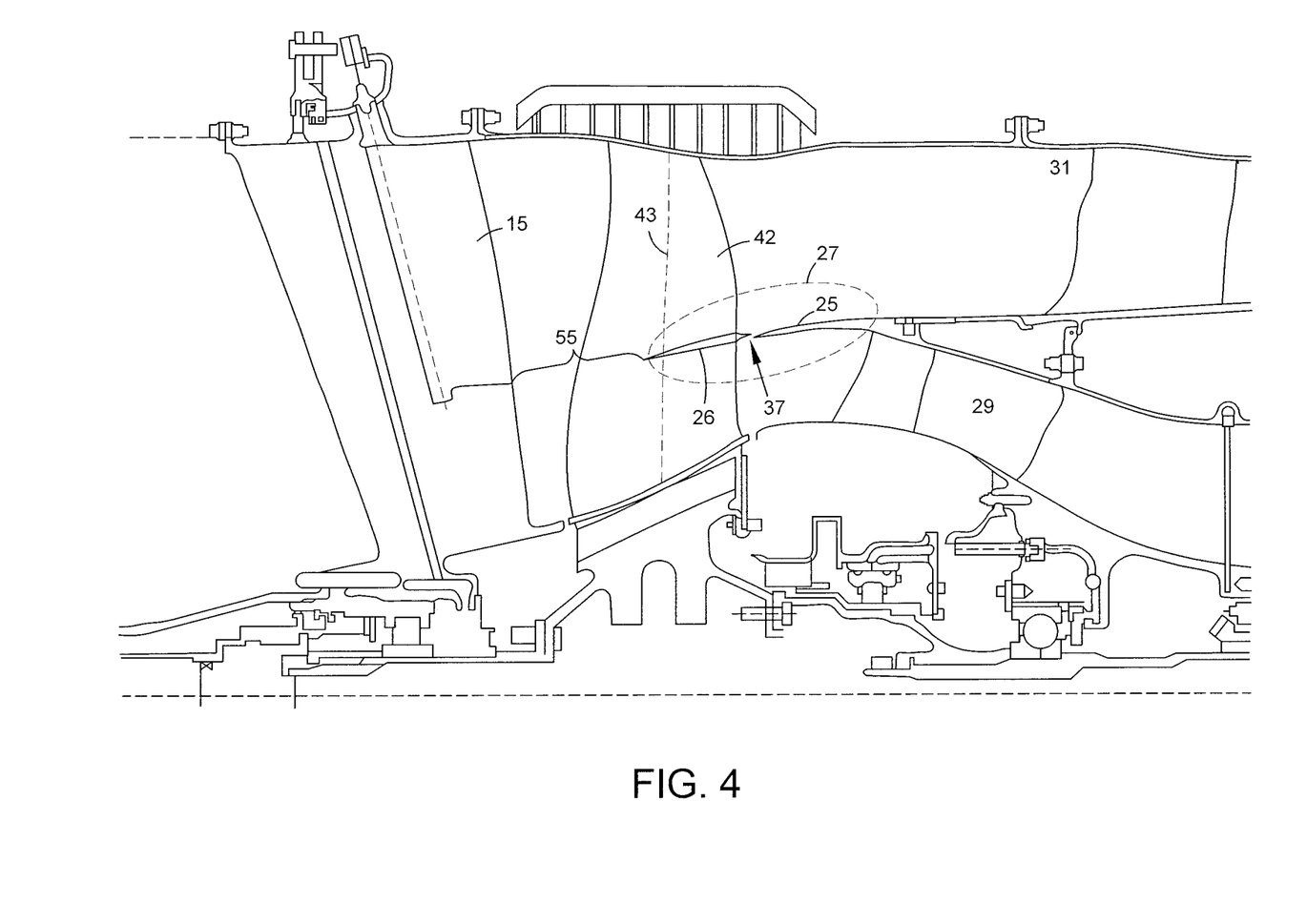
FIG. 4 is an illustration of a turbofan engine without an upstream splitter according to an embodiment of the disclosed subject matter.

FIG. 3 illustrates a blade splitter 26 within the fan 42 and a splitter 25 behind the fan 42. The splitter assembly 27 (blade splitter 26 and splitter 25) interface with each other with a rotating seal or discourager located just behind the fan 42. The blade splitter 26 extends axially at least past the midchord 43 of the fan 42. It is advantageous to have a long enough splitter to discourage flow migration but not long enough that the flow and pressure communication between core and bypass is affected which may adversely affect the operating range of the fan 42. In FIG. 3, the inlet guide vane 15 also employs an inlet guide vane splitter 24. Unlike the blade splitter 26 and splitter 25, the inlet guide vane splitter 24 positioned upstream from the fan blade 42 at the bottom of the inlet guide vane 15 remains axially displaced from the blade splitter 26 to preserve flow communication. FIG. 4 illustrates an embodiment without an upstream splitter.

The leading edge of the blade splitter 26 as shown in FIG. 3 is located axially just forward of the midchord line 43, however, it is envisioned that an axial location between ¾ and ½ of the local cord from the trailing edge will obtain the desired balance between stream separation and flow communication. FIG. 3 illustrates the embodiment in which the leading edge of the blade splitter 26 is located at the ⅔ of the local chord from the fan's trailing edge. The trailing edge of the blade splitter 26 terminates proximate to the trailing edge of the fan 42 at the interface with the downstream splitter 25. As noted above the interface may be a seal or discourager 37. The seal or discourager 37 may be carbon seal, a labyrinth seal, lip seal or another conventional type seal. Favorable characteristics of the seal 37 include minimal interference with the bypass and core flows, minimum friction and minimum manufacturing and assembly cost. Moreover, the seal or discourager 37, need only restrict flow from the core to the bypass duct, a hundred percent seal is not required.

Figure 5:
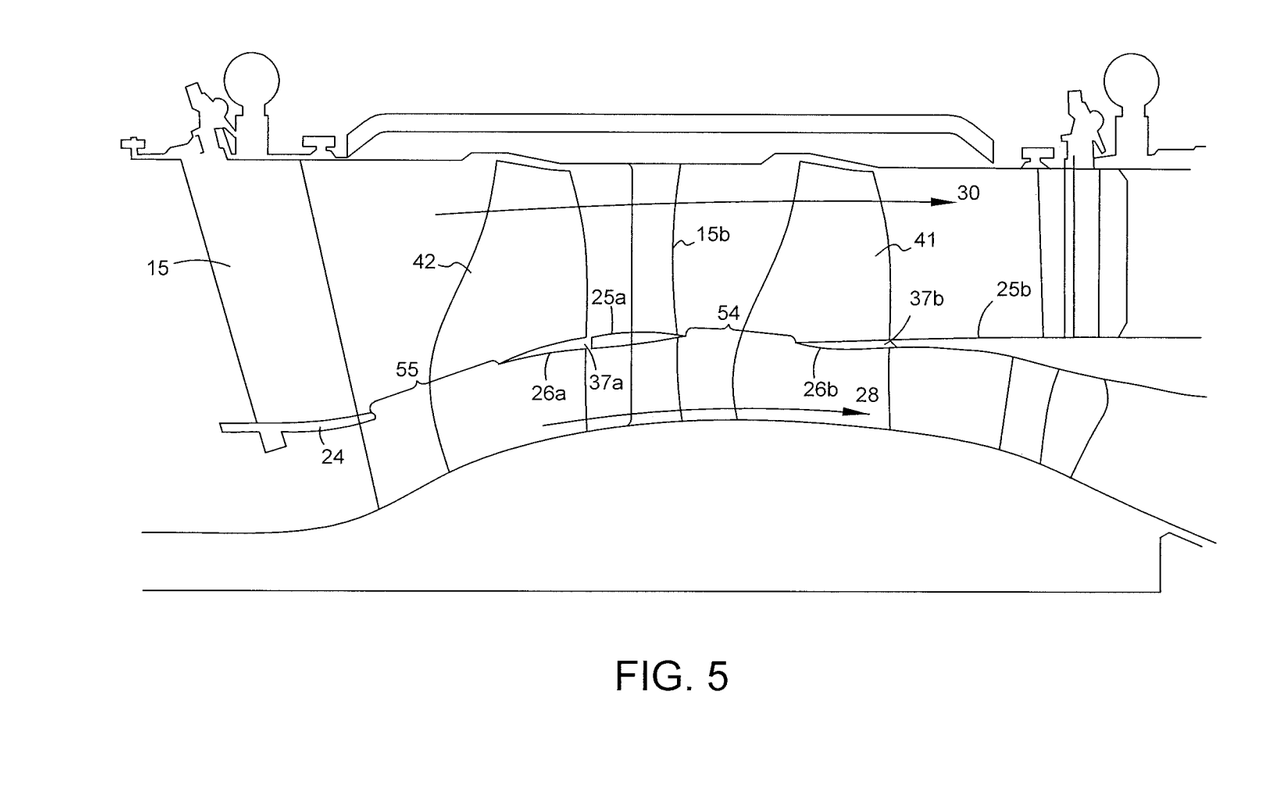
FIG. 5 is an illustration of with multiple fan stages according to embodiments of the disclosed subject matter.

FIG. 5 is an illustration of an additional splitter with multiple fan stages according to embodiments of the disclosed subject matter. The forward fan 42 and rear fan 41 may be nested with a midstream splitter 25a between them. In such case, the midstream splitter 25a downstream from the inlet guide vane splitter 24 by communication gap 55, would interface with the blade splitter 26a with a seal or discourager 37a and terminate prior to the second fan 41 as to preserve a second communication gap 54, a second blade splitter 26b, would likewise interface with the second splitter 25b. An additional guide vane 15b may also be between the forward fan 42 and rear fan 41, intersecting the midstream splitter 25a. The guide vane 15b while shown operating on both the bypass flow 30 and core flow 28, may also be limited to only one of the flows, likewise the guide vane 15b may fixed as shown or adjustable. Thus communication between the streams is maintained while separating the flows the allowing a wide operating range with reduced leakage.

Figure 6:
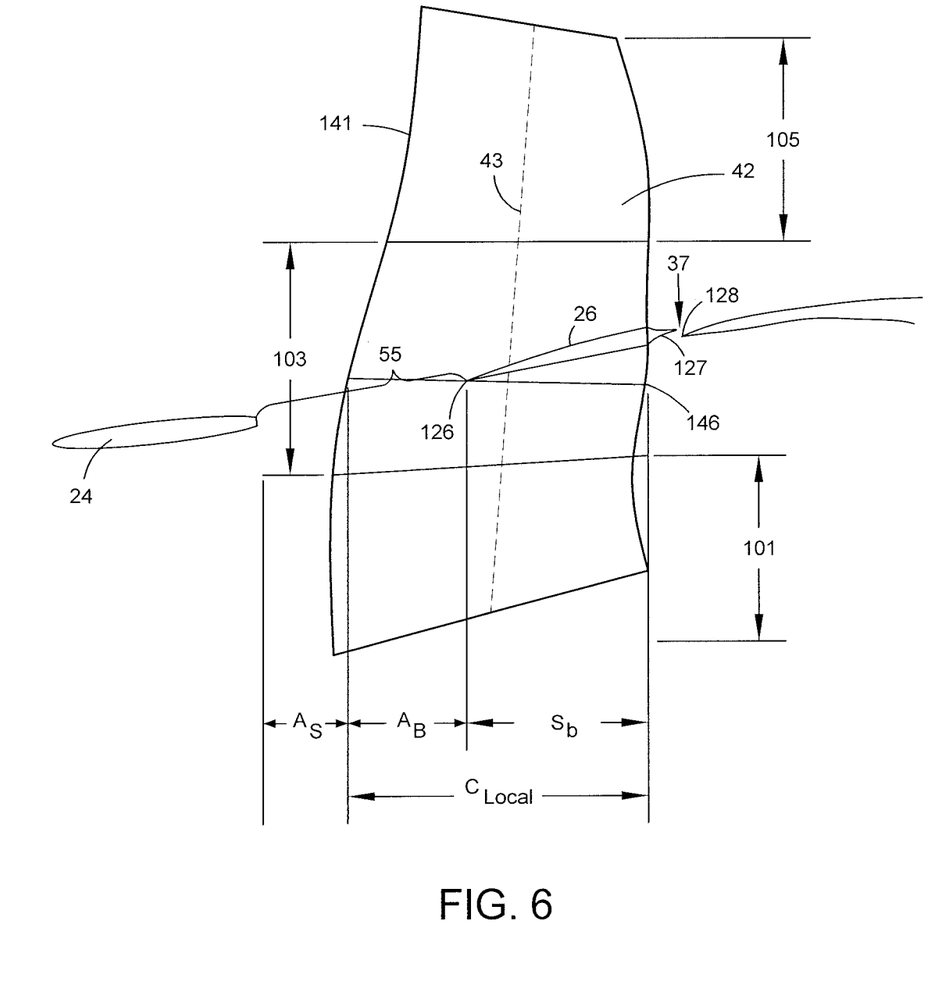
FIG. 6 is an illustration of the blade splitter according to embodiments of the disclosure subject matter.

FIG. 6 is a detailed illustration of the blade splitter 26 on fan blade 42. The fan 42 has a leading edge 141, trailing edge midchord line 43 and a midspan chord 146. The blade splitter 26 includes a leading edge 126 and trailing edge 127. The trailing edge 127 interfaces with the leading edge 128 of the downstream splitter 25 via a seal or discourager 37. The downstream splitter 25 is fixed with respect to the engine casing (not shown). An upstream splitter 24 is axially forward of the fan 42. As shown in FIG. 6, the blade is generally divided radially into thirds, the first third 101 near the root, the middle third 103 and outer third 105. The blade splitter is preferably located in the middle third 103. The leading edge 126 of the blade splitter 26 preferably is forward of the midchord 43 and is proximate the midspan cord 146, the overlap of the blade splitter 26 on the blade being shown as $S_b$ and the length of the midspan chord shown as $C_{local}$. The ratio of $S_b/C_{local}$ being from ⅞ to ½, preferably from ¾ to ½, and specifically around ⅔rds.

The communication gap 55 by which communications between the bypass flow and core flow is maintained is function of the axial distance from the upstream splitter 24 and the leading edge 126 of the blade splitter 26. The communication gap 55 includes an axial component ($A_S$) between the trailing edge of the upstream splitter 24 and the leading edge 141 of the fan 42 ($A_S$ is typically minimized, but for the now recognized advantageous communication between flows) and an axial component ($A_B$) between the leading edge 141 of the fan 42 and the leading edge 126 of the blade splitter 26. The communication gap (G) equaling $A_B+A_S$, (i.e. G is a function of $A_S$ and $C_{local}$) where $A_S$ is preferably less than or equal to $A_B$ and non-zero when the overlap is ⅔ or lower. The communication gap 55 may also be less than or equal to the chord length $C_{local}$ and preferably less than or equal to the overlap $S_b$. For example, where $S_B$ is ½ $C_{local}$, the gap G may approach ½ $C_{local}$ with $A_S$ approaching zero, whereas when $S_B$ is ⅞ $C_{local}$, the gap may be ½ $C_{local}$, where $A_S$ is greater than $A_B$. The communication gap ranging between ⅛ $C_{local}$ and $C_{local}$, preferably between ⅛ $C_{local}$ and ½ $C_{local}$. A balance exists between advantageously increasing $S_B$ to minimize leakage while maintaining an adequate communication gap G as to not detrimentally restrict the operating range.

The blade splitter may, advantageously, also minimize vibration and dynamics. Typically, shrouds used for this purpose are at higher spans, but while the disclosed shroud is not primarily a vibration reduction feature, but given its structure it may be beneficial to address these issues as well as the aerodynamic and performance discussed herein.

While preferred embodiments of the present invention have been described, it is to be understood that the embodiments described are illustrative only and that the scope of the invention is to be defined solely by the appended claims when accorded a full range of equivalence. Many variations and modifications naturally occurring to those of skill in the art from a perusal hereof.

What I claim is:

1. A turbofan engine comprising:
   a first fan;
   a core duct defining a portion of a core fluid path;
   a bypass duct defining a portion of a bypass fluid path, the bypass duct concentric with the core duct and radially displaced from the core duct;
   a downstream splitter defining an annular border portion between the core duct and the bypass duct; and downstream of the first fan;
   an annular border region extending between a leading edge of the first fan and a leading edge of the downstream splitter; the annular border region separating the core fluid path and the bypass fluid path, wherein the first fan rotates through the annual border region;

a shroud within the annular border region, extending between blades in the first fan, the shroud having a leading edge downstream from a leading edge of the blades and upstream of a midchord of the blades, wherein the shroud rotates with respect to the downstream splitter;

a seal between a trailing edge of the shroud and the leading edge of the downstream splitter; the seal restricting migration from the core fluid path to the bypass fluid path;

a variable inlet guide vane upstream of the first fan, the variable inlet guide restricting a bypass flow through the bypass fluid path at a first position and not restricting the bypass flow at a second position; and an additional splitter, a second fan, and a second seal, the second fan positioned upstream of the first fan, said second fan comprising a second shroud extending axially from a trailing edge of the second fan to at least to a local midchord of a blade of the second fan but short of a leading edge of the second fan, the second seal connecting a trailing edge of the second shroud with a leading edge of the additional splitter.

2. A turbofan engine comprising:

a fan;

a core duct defining a portion of a core fluid path;

a bypass duct defining a portion of a bypass fluid path, the bypass duct concentric with the core duct and radially displaced from the core duct;

a splitter defining an annular border portion between the core duct and the bypass duct; and downstream of the fan;

an annular border region extending between a leading edge of the fan and a leading edge of the splitter; the annular border region separating the core fluid path and the bypass fluid path, wherein the fan rotates through the annual border region;

a shroud within the annular border region, extending between blades in the fan, the shroud having a leading edge downstream from a leading edge of the blades and upstream of a midchord of the blades, wherein the shroud rotates with respect to the splitter;

a seal between a trailing edge of the shroud and the leading edge of the splitter; the seal restricting migration from the core fluid path to the bypass fluid path, wherein the seal and the leading edge of the splitter do not overlap; and a variable inlet guide vane upstream of the fan, the variable inlet guide restricting a bypass flow at a first position and not restricting the bypass flow at a second position.

3. The turbofan engine of claim 2, wherein a pressure in the core fluid path is higher than a second pressure in the bypass fluid path when the variable inlet guide vane is at the first position.

4. The turbofan engine of claim 2, further comprising an upstream splitter defining an annular first border portion between the core duct and the bypass duct.

5. The turbofan engine of claim 2, wherein the seal is selected from the group consisting of labyrinth seal, lip seal and carbon seal.

6. The turbofan engine of claim 2, wherein the shroud extends axially forward from a trailing edge of the fan no more than 2/3 of a local chord on the fan.

7. The turbofan engine of claim 2, wherein the shroud extends axially forward from a trailing edge of the fan no more than 3/4 to 1/2 of a local chord on the fan.

8. The turbofan engine of claim 2, wherein the fan has a blade span and the shroud is radially located on the middle third of the blade span.

9. The turbofan engine of claim 2, wherein the shroud is concentric with the fan.

10. The turbofan engine of claim 4, further comprising a communication gap between a trailing edge of the upstream splitter and the leading edge of the shroud, the communication gap having an axial component between the trailing edge of the upstream splitter and the leading edge of the blade that is greater than or equal to another axial component between the leading edge of the blade and the leading edge of the shroud.

11. The turbofan engine of claim 2, further comprising an upstream splitter on the variable inlet guide vane, the upstream splitter having a trailing edge axially displaced from the leading edge of the fan.

12. The turbofan engine of claim 2, wherein the shroud extends axially forward from a trailing edge of the fan no more than 7/8th of a local chord on the fan.

13. The turbofan engine of claim 2, wherein the shroud is concentric with the fan.

14. The turbofan engine of claim 11, further comprising a communication gap between a trailing edge of the upstream splitter and the leading edge of the partial midspan shroud, the communication gap having an axial component between the trailing edge of the upstream splitter and the leading edge of the fan that is at least equal to another axial component between the leading edge of the fan and the leading edge of the partial midspan shroud.

\* \* \* \* \*